US009392488B2

(12) United States Patent
Stenfelt et al.

(10) Patent No.: US 9,392,488 B2
(45) Date of Patent: Jul. 12, 2016

(54) METHOD, APPARATUS, SYSTEM, COMPUTER PROGRAM AND COMPUTER PROGRAM PRODUCT FOR MITIGATING END USER CONGESTION IN A WIRELESS NETWORK

(71) Applicant: TELEFONAKTIEBOLAGET L M ERICSSON (PUBL), Stockholm (SE)

(72) Inventors: John Stenfelt, Gothenburg (SE); Josefin Karlsson, Torslanda (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 38 days.

(21) Appl. No.: 14/302,084

(22) Filed: Jun. 11, 2014

(65) Prior Publication Data
US 2014/0369197 A1 Dec. 18, 2014

Related U.S. Application Data

(60) Provisional application No. 61/834,106, filed on Jun. 12, 2013.

(51) Int. Cl.
*H04W 28/02* (2009.01)
*H04L 29/06* (2006.01)
(Continued)

(52) U.S. Cl.
CPC ............ *H04W 28/0289* (2013.01); *H04L 47/24* (2013.01); *H04L 47/32* (2013.01); *H04L 69/22* (2013.01); *H04W 28/0231* (2013.01); *H04W 28/0273* (2013.01)

(58) Field of Classification Search
CPC ................... H04W 28/0289; H04W 28/0231; H04W 28/0273; H04L 47/24; H04L 47/32; H04L 69/22
See application file for complete search history.

(56) References Cited

U.S. PATENT DOCUMENTS

2011/0158090 A1 6/2011 Riley et al.
2013/0012243 A1* 1/2013 Nishida ............... H04W 76/007
455/458
(Continued)

FOREIGN PATENT DOCUMENTS

WO    2010002299 A1    1/2010

OTHER PUBLICATIONS

"3rd Generation Partnership Project; Technical Specification Group Services and System Aspects; Policy and Charging Control Architecture (Release 11), 3GPP TS 23.203 V11.2.0," Jun. 12, 2011, 142 pages.
(Continued)

*Primary Examiner* — Paul H Masur
(74) *Attorney, Agent, or Firm* — Rothwell, Figg, Ernst & Manbeck, P.C.

(57) ABSTRACT

A method, gateway apparatus, computer program, and computer program product for mitigating end user congestion in a wireless network is provided. The gateway apparatus is in a core network and receives from a radio access network (RAN) a message comprising cell congestion information indicating that a cell of the RAN is in a congested state. The gateway apparatus receives via a packet data network (PDN) a downlink (DL) network packet addressed to a wireless communication device, WCD, attached to the core network via said cell of the RAN. In response to receiving the DL network packet, the gateway apparatus determines a classification of the DL network packet. After determining the classification of the DL network packet, the gateway apparatus processes the DL network packet in accordance with the cell congestion information and the determined classification of the DL network packet.

24 Claims, 9 Drawing Sheets

(51) Int. Cl.
*H04L 12/851* (2013.01)
*H04L 12/823* (2013.01)

(56) References Cited

U.S. PATENT DOCUMENTS

| | | | | |
|---|---|---|---|---|
| 2013/0201824 | A1* | 8/2013 | Venkatachalam | H04W 28/12 370/230 |
| 2013/0315063 | A1* | 11/2013 | Racz | H04L 47/32 370/230 |
| 2014/0022900 | A1* | 1/2014 | Salot | H04W 28/0205 370/235 |
| 2014/0036667 | A1* | 2/2014 | Balasubramanian | H04W 28/0231 370/230 |
| 2014/0254356 | A1* | 9/2014 | Jeong | H04W 28/10 370/229 |
| 2014/0293796 | A1* | 10/2014 | Jeong | H04M 15/66 370/236 |
| 2014/0308961 | A1* | 10/2014 | Xu | H04W 40/36 455/438 |
| 2015/0156666 | A1* | 6/2015 | Won | H04W 28/0289 370/229 |

OTHER PUBLICATIONS

China Telecom et al., "RPPF Based Solution for Operator Controlled Off-Path Congestion Awareness and Notification," 3GPP Draft; S2-131610 Operator Controlled Off-Path Congestion Awareness and Notification, Final, 3rd Generation Partnership Project (3GPP), Mobile Competence Centre, 650, Route Des Lucioles; F-06921, vol. SA WG2 Meeting #S2-97, May 27-31, 2013, Busan, South Korea, 10 pages.

International Search Report and Written Opinion, Mail Date: Aug. 13, 2014, PCT/EP2014/062073, International Filing Date: Jun. 11, 2014, Applicant: Telefonaktiebolaget L M Ericsson (publ), 12 pages.
ETSI TS 123 060 V11.9.0 (Mar. 2014), Technical Specification, "Digital Cellular Telecommunications System (Phase 2+); Universal Mobile Telecommunications System (UMTS); General Packet Radio Service (GPRS); Service Description; Stage 2 (3GPP TS 23.060 version 11.9.0 Release 11)," Global System for Mobile Communication (3GPPGSM), 44 pages.
ETSI TS 136 413 V11.6.0 (Jan. 2014), Technical Specification, "LTE; Evolved Universal Terrestrial Radio Access Network (E-UTRAN); S1 Application Protocol (S1AP) (3GPP TS 36.413 version 11.6.0 Release 11)," 3GPP Advanced Lte™, A Global Initiative, 22 pages.
ETSI TS 129 274 V11.10.0 (Mar. 2014), Technical Specification, "Universal Mobile Telecommunication System (UMTS), LTE; 3GPP Evolved Packet System (EPS); Evolved General Packet Radio Service (GPRS), Tunnelling Protocol for Control Plane (GTPv2-C); Stage3 (3GPP TS 29.274 version 11.10.0 Release 11)," 3GPP Advanced Lte™, A Global Initiative, 29 pages.
ETSI TS 125 413 V11.6.0 (Mar. 2014), Technical Specification, "Universal Mobile Telecommunications System (UMTS); UTRAN Iu Interface Radio Access, Network Application Part (RANAP) Signalling, (3GPP TS 25.413 version 11.6.0 Release 11)," 3GPP™ A Global Initiative, 22 pages.
ETSI TS 123 401 V11.9.0 (Mar. 2014), Technical Specification, LTE; General Packet Radio Service (GPRS), Enhancements for Evolved Universal Terrestrial, Radio Access Network (E-UTRAN) Access, (3GPP TS 23.401 version 11.9.0 Release 11), 3GPP Advanced Lte™, A Global Initiative, 95 pages.

* cited by examiner

METHOD, APPARATUS, SYSTEM, COMPUTER PROGRAM AND COMPUTER PROGRAM PRODUCT FOR MITIGATING END USER CONGESTION IN A WIRELESS NETWORK

CROSS-REFERENCE TO RELATED APPLICATION

This application claims priority to U.S. Provisional Application No. 61/834,106, filed on Jun. 12, 2013, the entire content of which is incorporated by reference herein.

TECHNICAL FIELD

This disclosure relates to mitigating end user congestion in a wireless network, such as a wireless cellular network.

BACKGROUND

The amount of wireless broadband Internet traffic has increased at a tremendous pace during the last decade. The further development of High Speed Packet Access (HSPA), 4G LTE® and LTE-advanced now enables end users of wireless communication devices (WCDs) to obtain download speeds of tens—or even hundreds—of Mbps. This enables the use of applications with high demands on bitrates and delay. Apart from the challenges in providing high bitrates to users in indoor locations, wireless network operators are experiencing problems related to resource sharing, particularly in urban areas. In urban areas the number of simultaneously attached (and active) users may be high in certain cells of a wireless network. Since radio resources are shared between all users in the cell, the effective bitrate per user will drop inversely proportional (at best) with the number of active users in the cell. During busy hours, the effective bitrates in certain cells may be so low that the applications being run by the end users become "starved," resulting in TCP timeouts for web browsing, frozen images for video applications, etc. These occurrences are examples of end user congestion.

Cell congestion may arise when the resources of a cell are fully or nearly fully occupied. Cell congestion may lead to end user congestion for individual users if the received bit rate of a WCD in the cell cannot be sustained above an acceptable level over time for the application being used. Cell congestion may also occur without causing end user congestion, such as when a few users are consuming all resources of the cell, but the resulting throughput is generally high for all of the users.

SUMMARY

The present disclosure relates to handling traffic in a network based on the traffic's classification and based on congestion information. For instance, if a network packet is attempting to reach a WCD in a congested cell of a radio access network (RAN) the packet may be dropped (i.e., discarded) or queued for later delivery. In cases where network traffic is throttled (e.g., queued for later delivery), different network traffic may be throttled by different amounts. Network traffic classified as having higher priority may experience less throttling (e.g., no throttling) compared to network traffic classified as having lower priority.

The processing (e.g., throttling, dropping) of network traffic may be performed at a gateway apparatus, such as a serving gateway (SGW) or packet data network gateway (PGW) of a LTE network. The gateway apparatus may receive cell congestion information and determine a classification of a downlink (DL) network packet in order to decide how to process the packet. The cell congestion information may be received from, e.g., a base station, while the gateway apparatus may determine the classification by obtaining the classification from another network node (e.g., the SGW may obtain a classification of a DL network packet from a PGW).

The classification of network traffic may be based on a policy set by the network. For example, a policy and charging function (PCRF) node may provide a policy that affects how different packets are classified. The PCRF may transmit the policy to the PGW, which uses the policy to classify packets received by the core network.

By using a gateway apparatus to perform traffic processing based on congestion information and on a classification policy, the amount of information (e.g., cell congestion information) needed by the PCRF and the amount of decision-making required of the PCRF may be reduced. This reduction may decrease the amount of signaling to and from the PCRF. For instance, the reduction may relieve a PGW from having to transmit packets to the PCRF for classification by the PCRF. It may relieve a SGW from having to transmit cell congestion information to the PCRF and having to wait for an indication from the PCRF as to how the packet should be processed.

In one aspect, a method, gateway apparatus, computer program, and computer program product for mitigating end user congestion in a wireless network is provided. In one embodiment, the method is performed by a core network (CN) comprising the gateway apparatus (e.g., an SGW). The method includes the gateway apparatus receiving from a radio access network (RAN) a message comprising cell congestion information indicating that a cell of the RAN is in a congested state. The method also includes the gateway apparatus receiving via a packet data network (PDN) a downlink (DL) network packet addressed to a wireless communication device (WCD) attached to the core network via said cell of the RAN. In response to receiving the DL network packet, the gateway apparatus determines a classification of the DL network packet. After determining the classification of the DL network packet, the gateway apparatus processes the DL network packet in accordance with the cell congestion information and the determined classification of the DL network packet.

In one scenario, the core network further comprises a mobility management entity (MME). The MME may receive the cell congestion information from the RAN in an Initial Context Setup Response message. The gateway apparatus may receive the cell congestion information from the MME.

In one scenario, the cell congestion information is received at the gateway apparatus from the MME in an information element of a Modify Bearer Request message.

In one scenario, the gateway apparatus is a first gateway apparatus, and the core network further comprises a second gateway apparatus that receives the DL network packet from the packet data network and determines the classification of the DL network packet. The gateway apparatus may receive the DL network packet and information identifying the classification of the DL network packet from the second gateway apparatus. Determining the classification of the DL network packet may be based on the received information identifying the classification of the DL network packet.

In one scenario, processing the DL network packet in accordance with the cell congestion information and the determined classification of the DL network packet may comprise dropping the DL network packet as a result of a) determining, based on the cell congestion information, that the RAN is experiencing at least a threshold level of congestion and b) determining, based on the determined classification of the DL network packet, that the classification of the DL network packet matches one or more predetermined classifications.

In one scenario, processing the DL network packet in accordance with the cell congestion information and the determined classification of the DL network packet may comprise performing a traffic shaping process.

In one scenario, processing the DL network packet in accordance with the cell congestion information and the determined classification of the DL network packet may comprise modifying a TCP parameter (e.g., a TCP window size).

DETAILED DESCRIPTION

Figure 1:
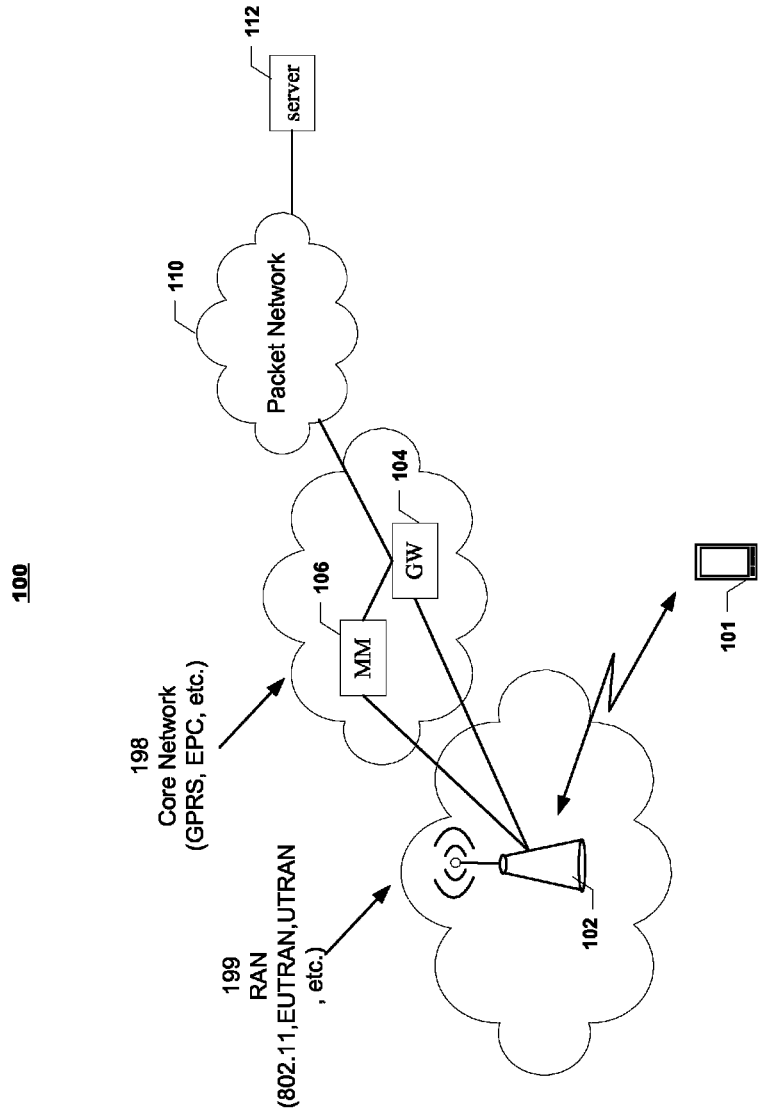
FIG. 1 illustrates an example system for mitigating end user congestion in a wireless network, according to an aspect of the present disclosure.

The present disclosure relates to processing network traffic, such as throttling certain network traffic in instances where a cell is congested.

Since GPRS/UMTS R99, bearers have been used for prioritizing certain services over a radio interface. Bearers carrying non-real time traffic belonging to high priority services or users are assigned a high Traffic Handling Priority (THP) or QCI that assures that the traffic receives superior treatment in a core network and radio access network in cases of congestion.

For GERAN and GPRS networks, a solution called SIRIG (Service Identification for RRC Improvements in GERAN) is provided that is based on the packet core network performing packet inspection and then marking each downlink (DL) user plane GPRS tunneling protocol (GTP) segment with a specific Service Class Identifier, SCI. Different actions may be taken based on the SCI.

For UTRAN, EUTRAN, and more generally EPS networks, additional mechanisms for processing traffic is being studied, such as in the 3GPP Rel-13 study item called User Plane Congestion (UPCON), which involves a secondary packet data protocol (PDP) context. However, the usefulness of secondary PDP-contexts for UTRAN and of dedicated bearers for EPS are limited because they are limited in their capability by the Traffic Flow Template (TFT) (e.g., the filters that allow a packet to be classified). Certain services may be hard to capture with a TFT, or frequent updates of the TFT may be needed.

3GPP SA1 has defined a set of use case scenarios in Rel-12 that UPCON solutions should address. 3GPP SA2 is discussing alternative solutions for UPCON. In general, solutions have been divided between RAN based solutions for RAN user plane congestion management and CN based solutions for RAN user plane congestion management. RAN based solutions for RAN user plane congestion management may rely on provisioning of additional information to the RAN to determine prioritization (e.g. SIRIG prioritization). CN based solutions for RAN user plane congestion management may rely on feedback from the core network to determine prioritization.

From an operational perspective, one advantage of a CN based solutions for RAN user plane congestion management compared to an RAN based solutions for RAN user plane congestion management is that the CN based solution could involve less integration and coordination between the radio access network (RAN) and the Core Network, CN, since the differentiation between priority levels could be done within the Core Network domain based on simple feedback between the RAN and the core network.

For example, some proposed CN based solutions involve sending sufficient information to the PCRF, which may take a policy decision on the information. The transmitted information includes, for example, user location information (cell level) and cell congestion information. The cell congestion information may be transmitted to the PCRF, for example, every few minutes. From a signaling perspective, these updates would significantly increase the signaling and/or processing load on the PCRF, requiring the PCRF to frequently make a decision on the priority of a packet and to communicate that decision to the policy and charging enforcement function (PCEF) in the PGW node or GGSN node.

This disclosure provides a solution that is less signaling intensive and that still provides effective congestion management. More particularly, the solution provides a gateway apparatus (e.g., SGW) that processes a packet based on cell congestion information and a classification of the packet. The processing may include, e.g., traffic shaping or dropping the packet. Because the gateway apparatus processes a packet based on congestion information, it can adjust to changes in cell congestion, even without involvement by the PCRF, and thus and reduces or eliminates the need to signal the PCRF about changes in congestion.

The gateway apparatus can determine a packet's classification by performing an algorithm to determine the packet's classification, or by obtaining the classification from another network node. For example, a SGW node in an EPC network can determine a packet's classification by obtaining a packet's classification from the PGW node. The node (e.g., PGW) that is performing the classification algorithm may do so according to a policy from the PCRF.

Thus, in an embodiment, the gateway apparatus is a serving gateway, SGW, and the provisioning of cell congestion information (CCI) to a SGW does not require the signaling of additional messages because the CCI may be included in an existing message, such as a Modify Bearer Message. Since the SGW may be a user plane node in the EPC architecture that is always aware of which WCDs that are currently active (e.g., connected) or not (e.g., idle), it may be best suited for enforcing congestion policies in the CN. Compared to other solutions in which information such as cell congestion information and user location are transmitted to the PCRF for further decision, the present disclosure may reduce or eliminate such extra signaling in the CN. For instance, it may eliminate the need for (1) signaling of congestion information between the SGW and PGW (over a S5/S8 interface) and (2) signaling of congestion information between the PGW and PCRF (over a Gx interface).

From a policy control perspective, the PCRF may be able to dynamically control traffic processing by applying a congestion policy to network traffic on a per-user and/or per-application basis. Congestion policies may be pre-defined, such as in the SGW or in an apparatus that hosts both the SGW and PGW.

FIG. 1 illustrates a wireless network 100 in which congestion management may take place. The wireless network 100 (e.g., an evolved packet system, EPS) enables a wireless communication device 101 (e.g., a user equipment, UE) to communicate with a server 112 (e.g., web server, video server, P2P node) connected to a packet data network 110 (e.g., the Internet). The wireless network 100 includes a radio access network, RAN, 199 and a core network, CN, 198. RAN 199 may be a UTRAN, EUTRAN, WLAN, or other radio access network. CN 198 may be a General Packet Radio Service (GPRS) core network, an Evolved Packet Core (EPC) network, or other core network.

RAN 199 may include a plurality of RAN nodes. In the example shown, RAN 199 includes a single RAN node 102. In practice, RAN 199 may include multiple RAN nodes, though a single RAN node 102 is shown for the sake of brevity. Each RAN node 102 may serve a cell that serves a plurality of WCDs 101. In the case where RAN 199 is an E-UTRAN, node 102 may be an E-UTRAN Node B, also known as Evolved Node B, (abbreviated as eNB or eNodeB). In the case where RAN 199 is a UTRAN, node 102 may include a Node B and/or a radio network controller (RNC). In the case where RAN 199 is a WLAN, node 102 may be a 802.11a/b/g/n router.

CN 198 includes, among other things, a mobility management apparatus 106 (e.g., an apparatus implementing a Mobility Management Entity) and a gateway apparatus (GW) 104 (e.g., an apparatus implementing at the least a Serving Gateway (SGW)).

Figure 2:
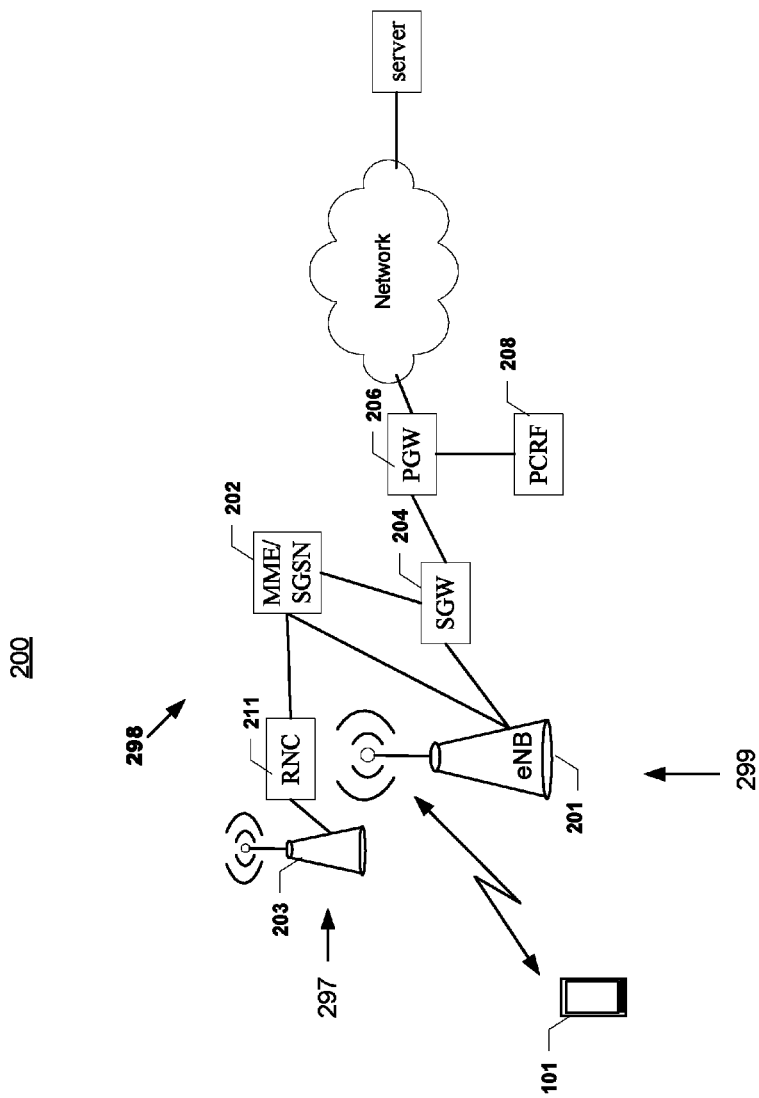
FIG. 2 illustrates an example system for mitigating end user congestion in a wireless network, according to an aspect of the present disclosure.

As a more specific example, FIG. 2 illustrates a wireless network 200 that includes an E-UTRAN 299, UTRAN 297, and a core network (CN) 298. As discussed above, however, this disclosure can be used with any type of RAN (e.g., GERAN, WLAN, etc) and any type of core network. In the system illustrated in FIG. 2, CN 298 includes, among other entities, a Mobility Management Entity (MME)/SGSN (e.g., an SGSN that supports the S4 interface for UTRAN and GERAN) 202, a Serving Gateway (SGW) 204, a PGW 206, and a Policy and Charging Rules Function (PCRF) 208. E-UTRAN 299 includes an eNB 201 which provides one or more cells for serving WCDs. UTRAN 297 includes a NodeB 203 and a radio network controller (RNC) 211. In some embodiments, SGW 204 and PGW 206 are implemented on different hardware, while in other embodiments SGW 204 and PGW 206 are combined and implemented on the same hardware platform.

In one specific embodiment, two separate pieces of information are utilized to mitigate end user congestion: 1) classification information and 2) cell congestion information. More specifically, in the embodiment of FIG. 2, PGW 206 may perform packet inspection to determine a classification for a downlink, DL, network packet. The PGW 206 classifies DL network packets for a user session according to congestion policies. For example, certain traffic may be allowed to flow during congestion while other traffic may be subject to a more restrictive forwarding policy during times of congestion. The congestion policies for a user may be pre-configured in the PGW and potentially dynamically controlled through a policy and charging control, PCC, rule or PCC-rule-base installations by PCRF 208.

In cases where the CN 298 does not include a combined PGW/SGW (e.g., an S5 or S8 exists between the SGW 204 and the PGW 206), then the PGW 206 may provide the classification information, CI, to the SGW on a per packet basis in the User Plane by applying packet marking. The CI includes, e.g., a class identifier (CID) such as, but not limited to, a Service Class Identifier (SCI). The CID marking is not required to be forwarded from the SGW towards the RAN. For the case of an apparatus that combines the PGW/SGW, the classification information may be known internally by the apparatus. The classification can make the SGW aware of which packets are associated with a certain forwarding behavior in case of congestion.

When a RAN node (e.g., eNB or RNC) detects a state of congestion in the RAN (e.g., in a cell of the RAN served by the RAN node), the RAN node can include cell congestion information in an information element (IE) that is sent to the MME (or SGSN) 202. The cell congestion information can include a congestion flag that reflects the level of congestion. In some cases, the congestion flag may be a binary indicator (e.g., congested or not congested). In some cases, the congestion flag may have a numerical value (e.g., level of congestion).

There are many ways for a RAN node to detect a state of congestion. For example, a RAN node may detect that the amount of available radio resources has been below a predetermined threshold value for a predetermined period of time. For E-UTRAN access, the following procedures may be involved:
  E-RAB Setup
  E-RAB Modify
  Initial Context Setup
  WCD Context Modification
  Handover Resource Allocation and/or Handover Notify
  Path Switch Request
For UTRAN access, the following procedures may be involved:
  RAB Assignment
  RAB Modify Request
  Relocation Resource Allocation Referring back to FIG. 2, the MME/SGSN 202 can include the congestion flag transparently in a GTP-C message (e.g., Modify Bearer Command) to the SGW 204. In this way the SGW 204 (or a GW that combines the SGW/PGW) can be made aware of a state of congestion in a cell on a per PDN-connection basis.

In the embodiment illustrated in FIG. 2, the SGW 204 (or, more generally, the gateway apparatus) takes the packet marking information (e.g., classification information) into consideration together with the "congestion flag" received from the MME/SGSN when it determines DL forwarding behaviors of the packets for a bearer. That is, the SGW 204 takes actions based on (1) the classification information and (2) the "congestion flag." The SGW may, for example, take no action, throttle the bandwidth, block the network traffic (e.g., discard the packet), or take some other action. The actions, or rather congestion policies, are assumed to be pre-defined in the SGW (or, more generally, in the gateway apparatus). The SGW 204 may thus apply a congestion dependent forwarding behavior of DL packets of all users.

Although the state of congestion may change frequently in a cell, the method of providing the congestion flag as a new parameter in existing messages, such as at S1 establishment for E-UTRAN access, may provide an adequate level of granularity to the gateway apparatus. Some measurements indicate that, on average, every attached WCD transitions in E-UTRAN between IDLE and CONNECTED roughly 20-30 times during a busy hour. Thus, in some scenarios, if the congestion state changes, the average time until a new congestion flag can be provided to the SGW for a certain WCD may be in the range of 2-3 minutes (note that the WCD may go back to IDLE rather early during that period of time). The aggregated effect of this mechanism for all WCDs in a cell may be to smooth out traffic that can be throttled or blocked during times of high congestion in the cell. In some embodiments, when the congestion state changes in the RAN (e.g. when the congestion goes from high to low), the eNB, RNC, or other RAN node may, in immediate response to the change in the level of congestion, send to the MME/SGSN 202 a message comprising congestion information that identifies the new level of congestion in the RAN, and the MME/SGSN 202 may forward this congestion information to the SGW 304.

In an embodiment, whenever the WCD 101 enters the Connected state or, due to mobility reasons, where the WCD 101 changes to another cell in connected mode, the eNB 201 (or RNC 211 if in UTRAN access) includes the "congestion flag" into a message sent to the MME/SGSN 202. The message may be an Initial Context Setup Response message.

In the embodiment, the MME/SGSN 202 may forward transparently the congestion flag (or other congestion information) to SGW 204 by including the congestion flag into a GTP-C message (e.g., a Modify Bearer Request) sent to the SGW 204 as part of a Service Request procedure. The Modify Bearer Request message may be used to provide the SGW 204 with, e.g., the IP address of the eNodeB or RNC and the GTP-U tunnel endpoint ID (TEID).

The congestion flag may include the RAN congestion level for the cell in which the WCD 101 is being served. Values for the congestion flag could include, for instance, "no congestion," "medium congestion," "high congestion," and "overloaded." Values for the congestion flag could also be a numerical value (e.g., a value between 1 and 100) or a simple binary indicator (congestion/no-congestion).

In cases where the SGW 204 and PGW 206 are located on separate apparatuses, the SGW 204 may receive from PGW 206 a message (e.g., a GTP packet) comprising a DL user plane packet and a classification identifier CID. In some cases, the message may include a service class indicator (SCI) as defined for 3GPP SIRIG. The SGW 204 may combine the CID with the congestion information and take further enforcement actions such as policing, shaping or even applying different TCP proxy settings. The actions to be taken are configured in SGW 204 by, for example, a mapping between action and the combination of CID and congestion combination. Whereas in SIRIG the CID may be forwarded toward the RAN, the SGW 204 may refrain from forwarding the CID toward the RAN.

Below in Table 1 is an example of a mapping between combinations of CID and congestion information and corresponding SGW 204 actions. The CID may be specific to different applications for a specific user, or may be specific to different users, or any combination thereof.

TABLE 1

| congestion flag | User plane packet marking (CID) | SGW 304 action |
| --- | --- | --- |
| No congestion | 10 | No action/forward packet |
| Medium congestion | 10 | Perform bandwidth throttling |
| Overloaded | 10 | Discard the user plane packet |
| No congestion | 1 | No action/forward packet |
| Medium congestion | 1 | No action/forward packet |
| Overloaded | 1 | No action/forward packet |

Example Mapping Between CID+Congestion Flag and Action in the Gateway

It could be possible to let the PCRF control the congestion policy through a policy and charging control (PCC) decision over the Gx interface. For example, in a situation in which the SGW and PGW are co-located on the same platform, congestion policies may be associated with pre-defined PCC-rules or PCC-rule-bases that are installed and removed over Gx. In situations in which the SGW 204 is on a stand-alone platform separate from PGW 206, packet marking schemes preconfigured in the PGW 206 may be associated with pre-defined PCC-rules or PCC-rule-bases that are installed and removed over Gx. This would allow for dynamic PCRF control of congestion policies without the need for sending, for example, continuous location updates and congestion information up to the PCRF (as proposed in 3GPP for the Rel-12 WI UPCON).

Figure 4:
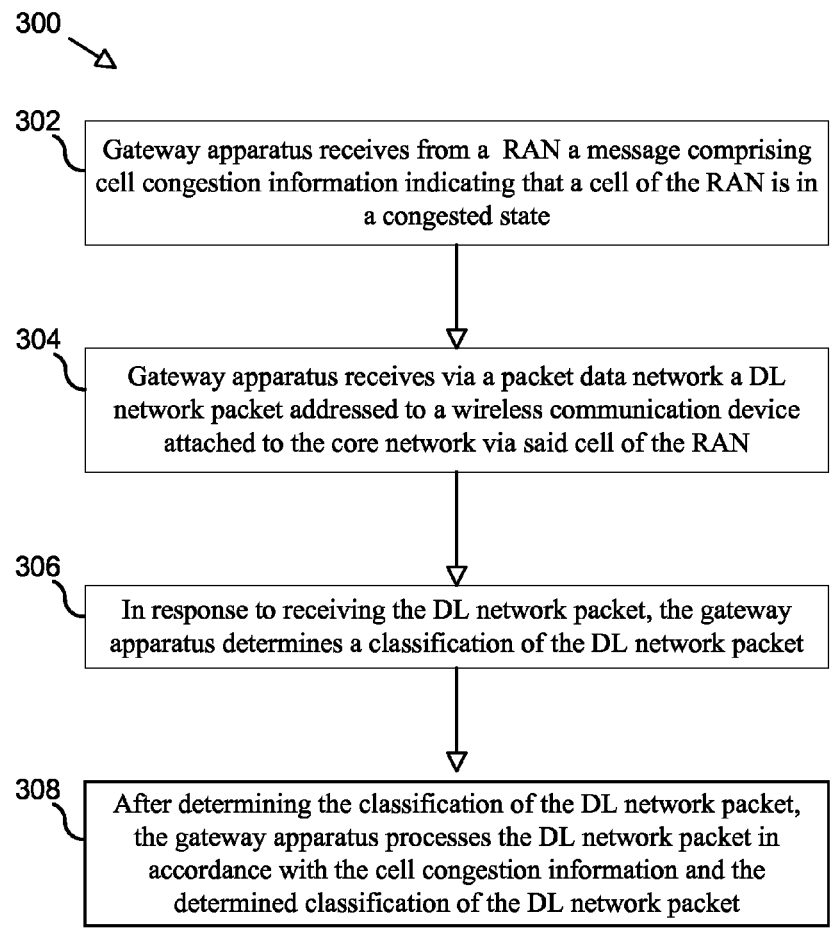
FIGS. 4-7 provide flow diagrams that illustrate example steps of a method for mitigating end user congestion in a wireless network, according to an aspect of the present disclosure.

FIG. 4 is a flow chart illustrating a method 300 for mitigating end user congestion, according to an aspect of the present disclosure. In an embodiment, method 300 is performed by a gateway apparatus such as GW 104, and may be performed for each wireless communication device (WCD) (e.g., a user equipment (UE)) served by the GW 104.

Method 300 includes step 302, in which the gateway apparatus receives from a RAN a message comprising cell congestion information indicating that a cell of the RAN is in a congested state.

Method 300 further includes steps 304 and 306. In step 304, the gateway apparatus receives via a packet data network a downlink, DL, network packet addressed to a wireless communication device (WCD) attached to the core network via the cell of the RAN. The DL network packet may be, for example, an IP packet with a destination field having an IP address of the WCD. In step 306, the gateway apparatus determines a classification of the DL network packet in response to receiving the DL network packet. Steps 304 and 306 may be performed before, after, or simultaneously with step 302.

In step 308, after determining the classification of the DL network packet, the gateway apparatus processes the DL network packet in accordance with the cell congestion information and the determined classification of the DL network packet.

Figure 5:
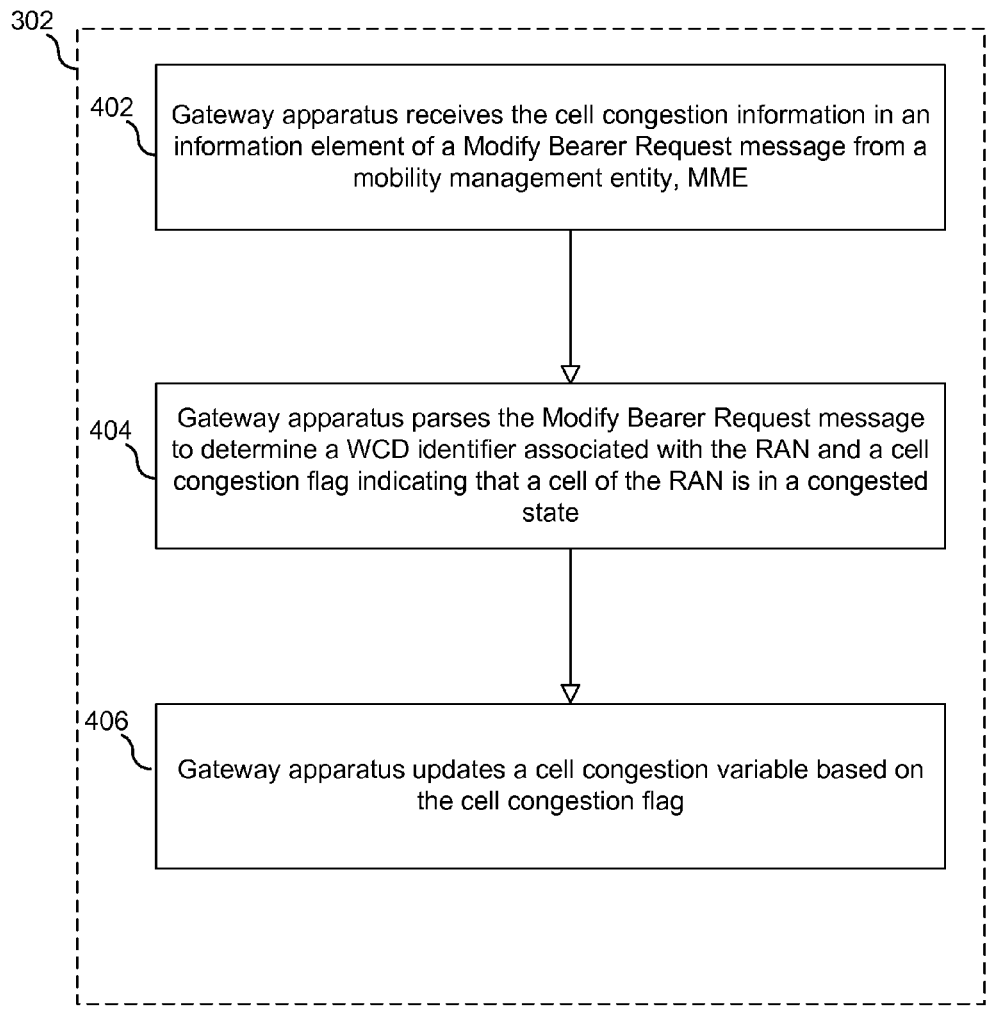

In some instances, as indicated in FIG. 5, step 302 may include steps 402-406. In step 402, the gateway apparatus receives the cell congestion information from a mobility management entity (MME) in the core network. The MME may relay the cell congestion information from the RAN to the gateway apparatus. More specifically, the MME may receive the cell congestion information from the RAN (e.g., from an eNB in the RAN) in an Initial Context Setup Response message. The MME may transmit the cell congestion information in an information element, IE, of a Modify Bearer Request message (or, more generally, a GPRS Tunneling Protocol (GTP) message). In some instances, the gateway apparatus may receive the cell congestion information from a SGSN, which may be located in the core network to interact with a RNC. In some cases, the cell congestion information includes a cell congestion flag which includes a variable that indicates whether the cell is congested. The variable may have only two possible values (e.g., "congested" or "not congested") or may have more granular values (e.g., "overloaded," "medium congestion," and "no congestion" or the set of numbers from 1 to 10). In some instances, the cell congestion information may be associated with a particular WCD in the cell, and the RAN may include a WCD identifier of the WCD with the cell congestion information. The MME or SGSN may transmit the WCD identifier along with the cell congestion information to the WCD. Examples of the WCD identifier include a IMSI or GTP-C Tunnel End Point Identifier associated with the IMSI.

In step 404, the gateway apparatus parses the Modify Bearer Request message (or any other GTP message) to determine the cell congestion information.

In step 406, the gateway apparatus updates a cell congestion variable based on the cell congestion flag. For example, the gateway apparatus may initialize a cell congestion variable to a value of zero, and may update the value to reflect a level of congestion indicated by the cell congestion flag.

Figure 6A:
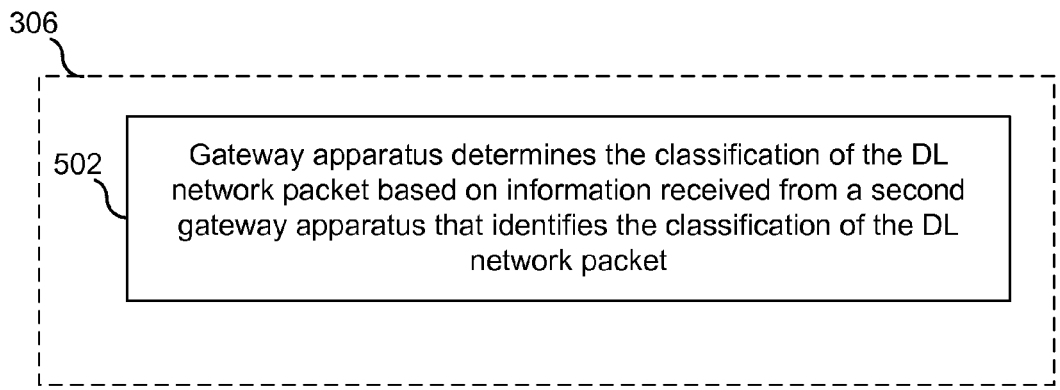

In some cases, the gateway apparatus is a first gateway apparatus of the core network, and may determine the classification of the DL network packet based on information received from a second gateway apparatus that identifies the classification of the DL network packet, as shown in step 502 of FIG. 6A. For example, the first gateway apparatus may be a SGW, and the second gateway apparatus may be a PGW that is located on a separate platform (e.g., a separate server). The PGW may receive the DL network packet and classify the packet. As discussed above, the PGW may receive a PCC rule from a PCRF and may classify the packet based on the rule. In some instances, the PGW may encapsulate the DL network packet and an indication of the DL network packet's classification in a tunneling protocol packet, which is transmitted to the SGW.

Figure 6B:
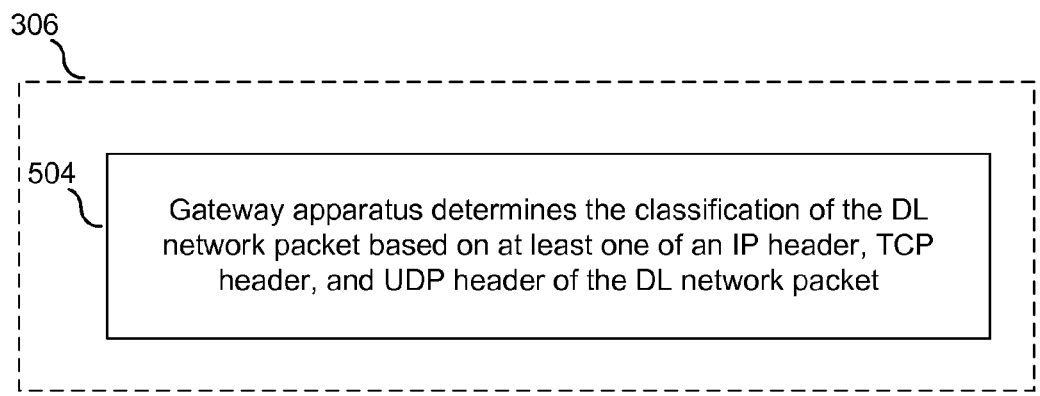

In some cases, such as when the gateway apparatus is a platform that hosts both a SGW and PGW, the gateway apparatus may perform its own analysis to determine the classification of the DL network packet. In one example shown in step 504 of FIG. 6B, the gateway apparatus may determine the classification of the DL network packet based on at least one of an IP header, TCP header, and UDP header of a DL network packet received from a router of the packet data network. In another example, the gateway apparatus may apply more advanced examination techniques, such as inspecting payload content of the DL network packet to determine a classification of the DL network packet.

Figure 7:
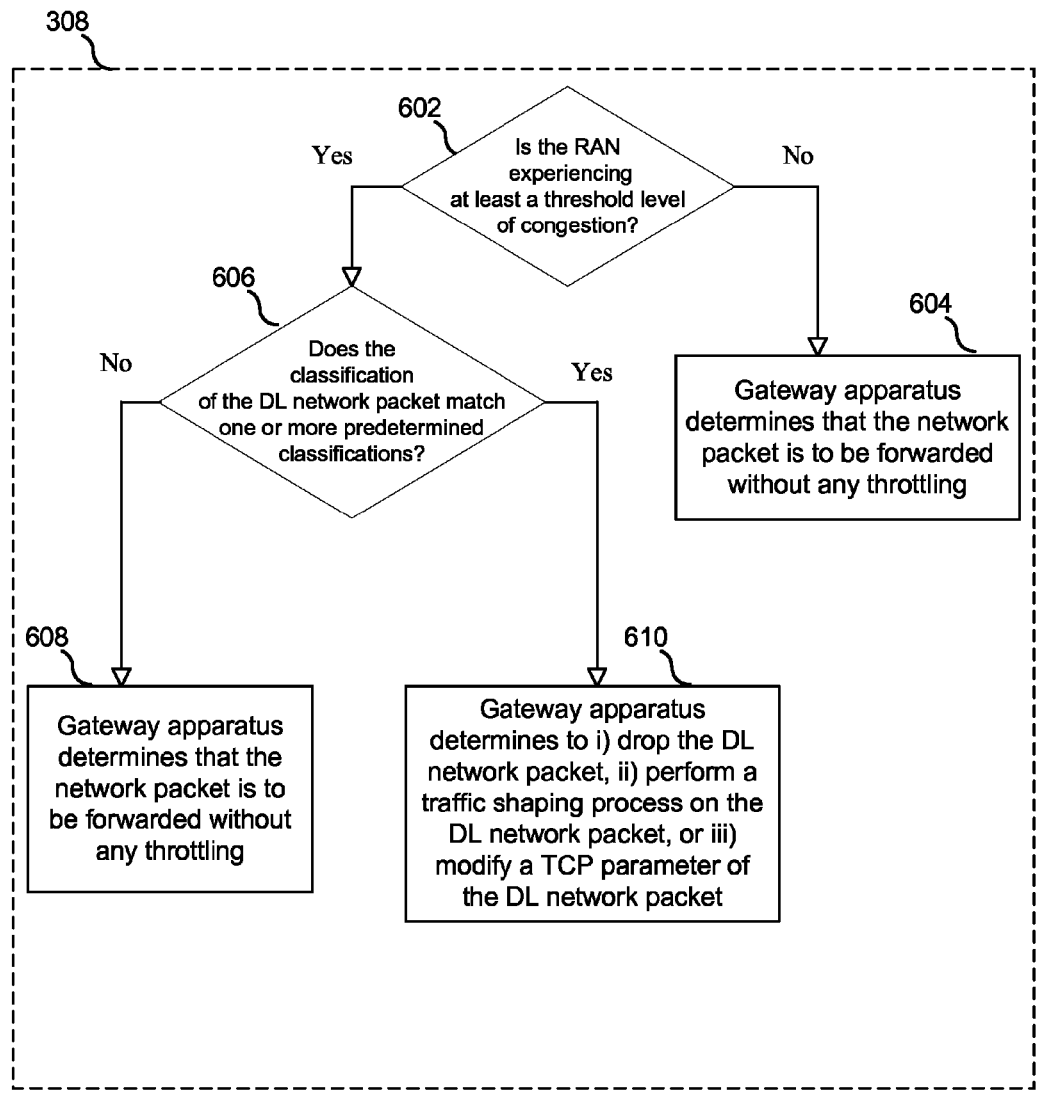

FIG. 7 illustrates example steps 602-610 for processing the DL network packet in accordance with the cell congestion information and the determined classification of the DL network packet. In steps 602, 606, and 610, the gateway apparatus may drop a DL network packet as a result of a) determining (step 602), based on the cell congestion information, that the RAN is experiencing at least a threshold level of congestion and b) determining (step 606), based on the determined classification of the DL network packet, that the classification of the DL network packet matches one or more predetermined classifications. As an example with reference to Table 1 above, the gateway apparatus may decide to drop (i.e., discard) a packet in response to determining that the cell congestion information indicates that the RAN is experiencing an "Overloaded" level of congestion and the classification of the packet has a value of "10," which may be associated with a low level of priority.

In some situations, the gateway apparatus may perform traffic throttling on a packet rather than drop the packet. For instance, step 610 shows that the gateway apparatus may perform a traffic shaping process on the DL network packet (e.g., queuing the DL network packet) or may modify a TCP parameter of the DL network packet. An example of such situations is provided in Table 1. It shows that if the RAN experiencing at least a "medium" level of congestion and the classification of the packet has a value of "10," the gateway apparatus may perform bandwidth throttling. The gateway apparatus may modify the TCP parameter in instances where it functions as a TCP proxy between the WCD and a server (e.g., server 112) with which the WCD is communicating through the packet data network (e.g., a first TCP connection is established between WCD 101 and GW 104 and a corresponding second TCP connection is established between GW 104 and server 112). The modified TCP parameter may be, for example, a TCP window size of a TCP connection between the gateway apparatus and the WCD or between the gateway apparatus and the server. In the above examples, each combination of cell congestion value and packet classification value may be considered a tuple that is mapped to an action (e.g., drop the packet, perform traffic shaping, or modify the TCP parameter) in the gateway apparatus.

Steps 604 and 608 show that the gateway apparatus may forward a packet without any throttling for certain values of congestion and packet classification. In step 604, the gateway apparatus may forward the packet toward its destination without any throttling in response to determining in step 602 that the RAN is not experiencing at least a threshold level of congestion. For instance, with reference to Table 1, the gateway apparatus may determine to forward packets without taking any traffic throttling action in response to determining that the cell congestion has a value of "No congestion." In the above examples, forwarding a packet may comprise forwarding only the payload in the packet, or forwarding the payload and one or more headers in the packet.

In step 608, the gateway apparatus may forward the packet toward its destination without any throttling in response to determining in step 606 that the classification of the DL network packet does not match one or more predetermined classifications. Turning again to Table 1, for example, the gateway apparatus may perform throttling for only packet classifications having a value of "10" or a value having lower priority. If the classification of the DL network packet does not match such predetermined classifications, the gateway apparatus may decide to forward the packet without any throttling.

The determination steps 602 and 606 in FIG. 7 may be performed in any order, or may be performed simultaneously. For instance, the gateway apparatus may first determine in step 606 whether the classification of the DL network packet match one or more predetermined classifications. If there is no match, the gateway apparatus may proceed to step 608 without performing step 602.

Figure 3:
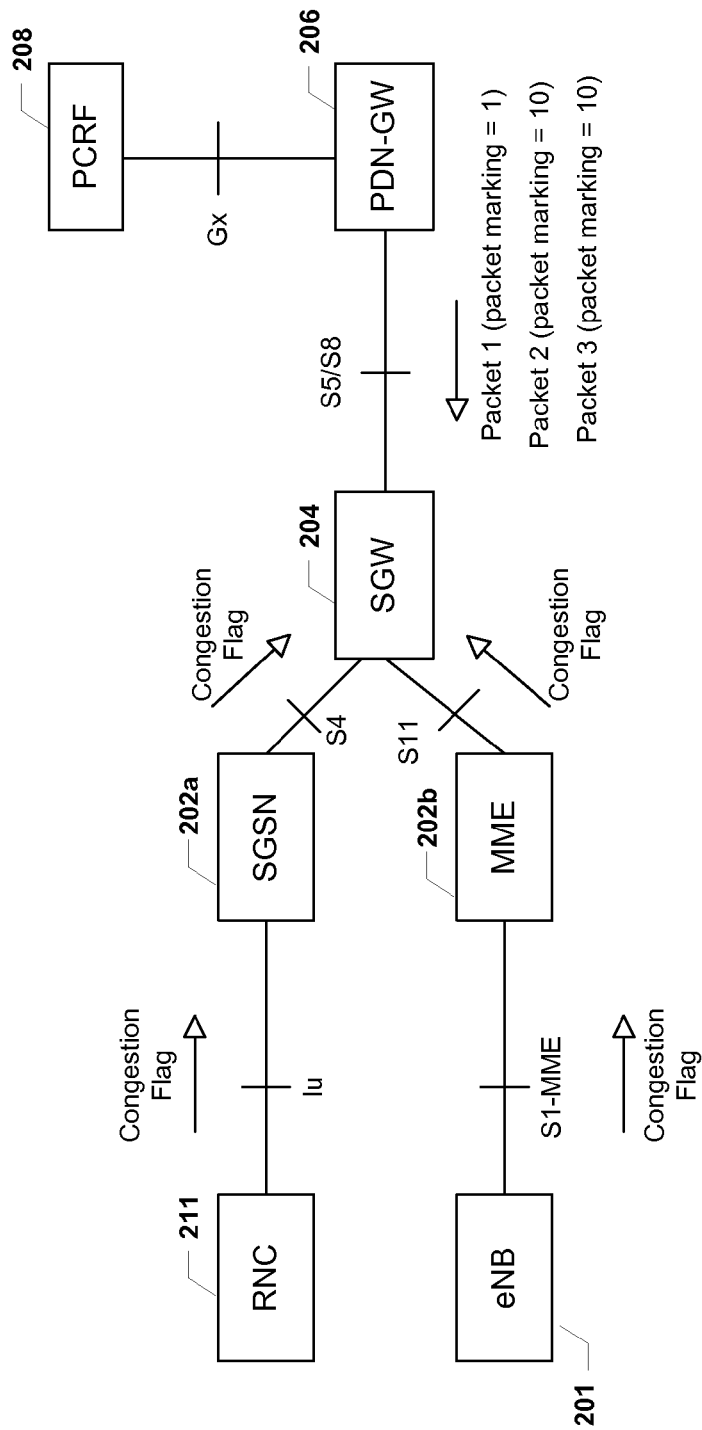
FIG. 3 illustrates an example system for mitigating end user congestion in a wireless network, according to an aspect of the present disclosure.
Figure 8:
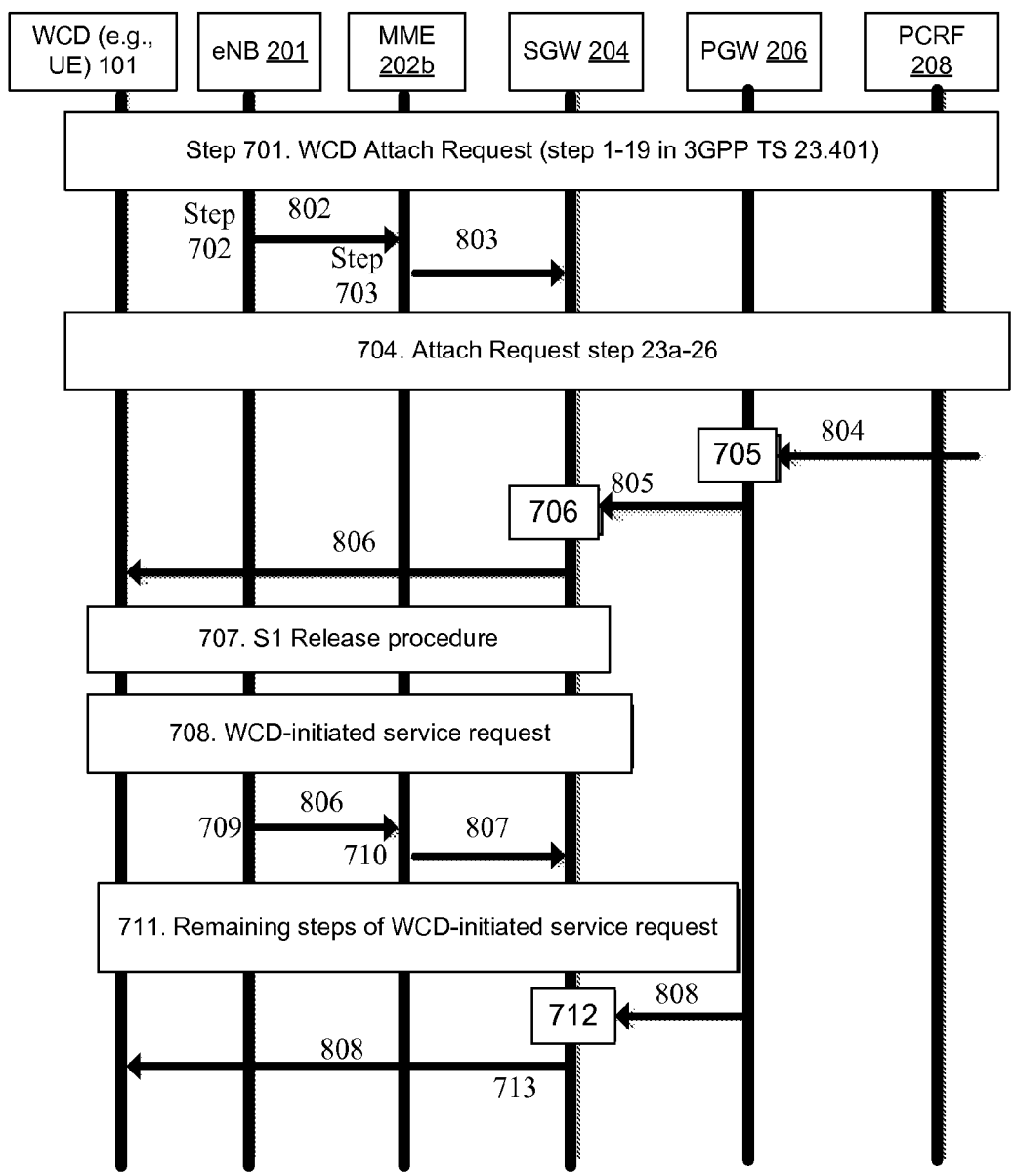
FIG. 8 provides an example flow of information that illustrates processing of traffic in a wireless network, according to an aspect of the present disclosure.

FIG. 8 provides an example LTE message flow that illustrates the processing of packets based on congestion information and packet classification in the systems illustrated in FIGS. 2-3.

In step 701, the WCD 101 initiates an initial attach procedure, which corresponds to steps 1-19 of the Attach procedure in 3GPP TS 23.401. The Attach procedure may involve an IP-CAN session establishment procedure between the PGW 206 and the PCRF 208. During that procedure, the PCRF 208 may provide the PGW 206 with a policy decision for enforcement of user plane packet marking in the downlink, DL. The packet marking may be, e.g., on a per service level, per user level, per QCI/ARP level, or any combination thereof. In cases where a PCRF is not deployed in the core network, the PGW may be provided with pre-defined policies (i.e. local policies) that decide the user plane packet marking of DL traffic. As one example, packets for P2P file sharing may be marked with CID=10 (in accordance to table 1), while all other traffic may be marked with CID=1.

In step 702, the eNB 201 sends an Initial Context Setup Response message 802 to the MME 202b. This Initial Context Setup Response message 402 includes the TEID of the eNB 201 and the address of the eNB 201 used for downlink traffic on the S1_U reference point in accordance with 3GPP procedures. In an embodiment, the eNB includes the cell congestion flag in the message 802. The flag may indicate a level of congestion in the cell, such as "medium congestion." After step 702, direct transfer and attach complete steps (corresponding to steps 21 and 22 in 3GPP TS 23.401) may take place.

In step 703, the MME 202b may have received the Initial Context Setup Response message 802 and the Attach Complete message, and may send a Modify Bearer Request message 803 to the SGW 204. Message 803 may include, for instance, an EPS Bearer Identity, eNB address, eNB TEID, Handover Indication, along with the congestion flag.

In step 704, the attach procedure may be completed based on steps 23a-26 in 3GPP TS 23.401.

In step 705, an incoming DL packet 804 is received by PGW 206 and classified by the PGW 206 through packet inspection. PGW 206 chooses a CID based on the determined classification of the DL packet 804. For example, in response to determining that DL packet 804 is part of a P2P traffic flow, then PGW 206 will choose a CID of 10; otherwise, it will choose a CID of 1. PGW 206 then encapsulates the DL packet 804 (or portions thereof) using GTP (i.e., a GTP-U header is added to the DL packet). The CID chosen for the packet based on the packet inspection is included in the GTP-U header. PGW 206 may then transmit to SGW 204 a GTP-U message 805 that comprises the DL packet and the CID.

In step 706, the SGW 204 receives the GTP-U message 805 and reads the marking for the packet (i.e., the CID or SCI included in the GTP-U header) and applies an action in accordance with the marking and congestion information indicated in the congestion flag received in message 803. In the example, the indication of "medium congestion" and a marking of CID=10 may cause SGW 204 to throttle traffic associated with the DL packet, while the SGW 204 may forward all other traffic (e.g., packets marked with CID=1) as is, without any throttling.

In step 707, S1 may be released with a S1 release procedure, such as because of an inactivity timeout.

In step 708, WCD 101 may initiate a service request procedure. While FIG. 8 shows a WCD-initiated service request, in some cases the service request procedure may be network-initiated, in which case the procedure may be preceded by transmission of DL data to the SGW 204 and a paging procedure to trigger the WCD-initiated service request.

In step 709, eNB 201 or another eNB sends an S1-AP Initial Context Setup Response message 806 to the MME 202b. The message 806 may include an eNB address, List of accepted EPS bearers, List of rejected EPS bearers, and S1 TEID(s) (DL), along with a congestion flag set to a value of "No Congestion."

In step 710, the MME 202b sends a Modify Bearer Request message 807 per PDN connection to the SGW 204. The message 807 may include an eNB address, S1 TEID(s) (DL) for the accepted EPS bearers, Delay Downlink Packet Notification Request, RAT Type, and the congestion flag.

In step 711, the remaining steps of a WCD-initiated service request is performed. WCD-initiated service request procedure continues according to standard procedures. In this example it is assumed that no Modify Bearer Request message has to be sent to the PGW, and that no interaction between the PGW and the PCRF takes place. As a result, there are no changes to the previously provided policies related to packet marking.

In step 712, an incoming DL packet 808 is classified like in step 705. The SGW may read the SCI marking for each packet and process the packet in accordance with the congestion flag.

In step 713, the SGW 204 may simply forward the packet 808 to the eNB 201 for any kind of packet classification in response to determining that the congestion status has a value of "No congestion." For instance, both P2P traffic (e.g., SCI=10) and all other traffic (e.g., SCI=1) may receive the same treatment when the congestion status has a value of "No congestion."

Example Gateway Apparatus

Figure 9:
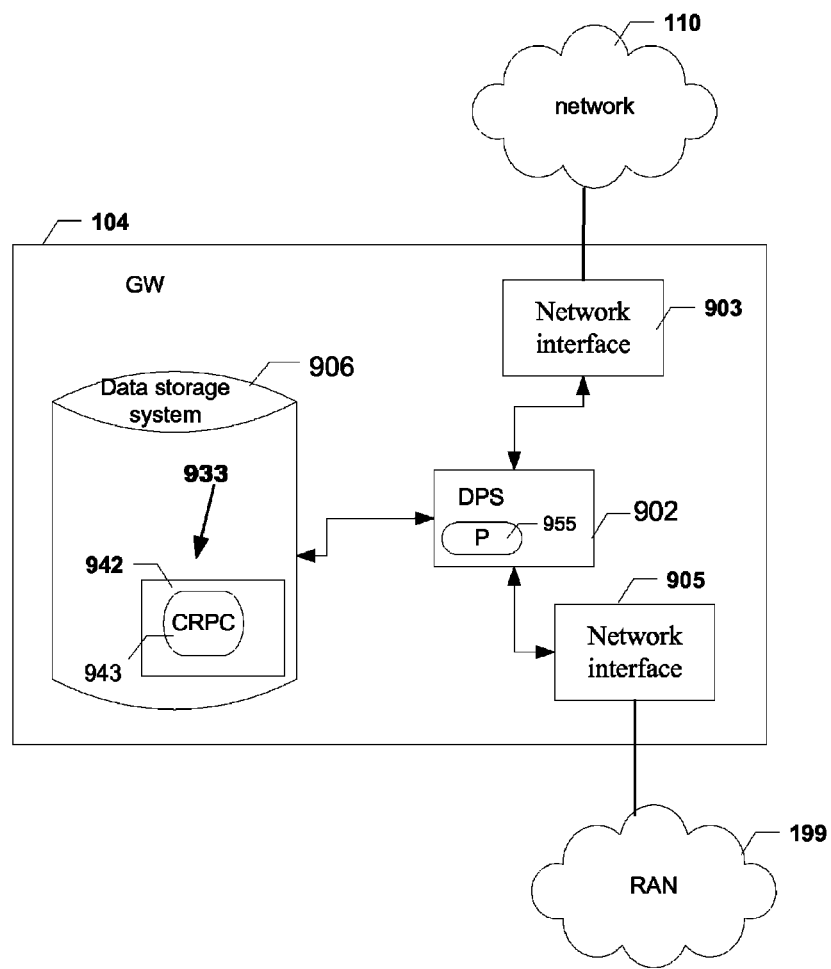
FIG. 9 illustrates an example gateway apparatus, according to an aspect of the present disclosure.

FIG. 9 illustrates a block diagram of an example gateway apparatus (GW) 104. In the embodiment shown in FIG. 9, GW 104 includes: a data processing system (DPS) 902, which may include one or more processors (P) 955 (e.g., microprocessors) and/or one or more circuits, such as an application specific integrated circuit (ASIC), Field-programmable gate arrays (FPGAs), etc.; a network interface 905 for connecting the GW 104 to one or more other nodes of CN 199; a data storage system 906, which may include one or more computer-readable data storage mediums, such as non-transitory memory unit (e.g., hard drive, flash memory, optical disk, etc.) and/or volatile storage apparatuses (e.g., dynamic random access memory (DRAM)). In embodiments where GW 104 includes a PGW, GW 104 also includes a network interface 903 for connection GW 104 to network 110.

In embodiments where data processing system 902 includes a processor 955 (e.g., a microprocessor), a computer program product 933 may be provided, which computer program product includes: computer readable program code 943 (e.g., instructions), which implements a computer program, stored on a computer readable medium 942 of data storage system 906, such as, but not limited to, magnetic media (e.g., a hard disk), optical media (e.g., a DVD), memory devices (e.g., random access memory), etc. In some embodiments, computer readable program code 943 is configured such that, when executed by data processing system 902, code 943 causes the data processing system 902 to perform steps described herein as being performed by GW 104 and SGW 204 (and also PGW 206, in some embodiments).

In some embodiments, GW 104 is configured to perform steps described above without the need for code 943. For example, data processing system 902 may consist merely of specialized hardware, such as one or more application-specific integrated circuits (ASICs). Hence, the features of the present invention described above may be implemented in hardware and/or software. For example, in some embodiments, the functional components of network node described above may be implemented by data processing system 902 executing program code 943, by data processing system 902 operating independent of any computer program code 943, or by any suitable combination of hardware and/or software.

While various aspects and embodiments of the present disclosure have been described above, it should be understood that they have been presented by way of example only, and not limitation. Thus, the breadth and scope of the present disclosure should not be limited by any of the above-described exemplary embodiments. Moreover, any combination of the elements described in this disclosure in all possible variations thereof is encompassed by the disclosure unless otherwise indicated herein or otherwise clearly contradicted by context.

Additionally, while the processes described herein and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for mitigating end user congestion, the method being performed by a core network comprising a gateway apparatus, the method comprising:
   the gateway apparatus receiving from a radio access network (RAN) cell congestion information indicating that a cell of the RAN is in a congested state;
   the gateway apparatus refraining from forwarding the received cell congestion information to any policy and charging rules function (PCRF) node;
   the gateway apparatus receiving a downlink (DL) network packet addressed to a wireless communication device attached to the core network via said cell of the RAN;
   in response to receiving the DL network packet, the gateway apparatus determining a classification of the DL network packet; and
   after determining the classification of the DL network packet, the gateway apparatus processing the DL network packet in accordance with the cell congestion information and the determined classification of the DL network packet.

2. The method of claim 1, wherein
   the core network further comprises a mobility management entity (MME) wherein the MME receives the cell congestion information from the RAN in an Initial Context Setup Response message,
   the gateway apparatus receives the cell congestion information from the MME.

3. The method of claim 2, wherein the cell congestion information is received at the gateway apparatus from the MME in an information element of a Modify Bearer Request message.

4. The method of claim 1 wherein
   the gateway apparatus is a first gateway apparatus,
   the core network further comprises a second gateway apparatus that receives the DL network packet from the packet data network and determines the classification of the DL network packet,
   the gateway apparatus receives the DL network packet and information identifying the classification of the DL network packet from the second gateway apparatus, and
   determining the classification of the DL network packet is based on the received information identifying the classification of the DL network packet.

5. The method of claim 1, wherein processing the DL network packet in accordance with the cell congestion information and the determined classification of the DL network packet comprises dropping the DL network packet as a result of a) determining, based on the cell congestion information, that the RAN is experiencing at least a threshold level of congestion and b) determining, based on the determined classification of the DL network packet, that the classification of the DL network packet matches one or more predetermined classifications.

6. The method of claim 1, wherein processing the DL network packet in accordance with the cell congestion information and the determined classification of the DL network packet comprises performing a traffic shaping process.

7. The method of claim 1, wherein processing the DL network packet in accordance with the cell congestion information and the determined classification of the DL network packet comprises modifying a TCP parameter.

8. The method of claim 7, wherein the TCP parameter is a TCP window size.

9. The method of claim 1, wherein:
   the gateway apparatus is a serving gateway (SGW),
   the core network further comprises a packet data network gateway (PGW), the SGW and the PGW being separate apparatuses,
   the receiving of the DL network packet comprises the SGW receiving, from the PGW, a general packet radio service (GPRS) tunneling protocol (GTP) packet that includes the DL network packet and a classification identifier, and
   the determining of the classification of the DL network packet is based on the classification identifier in the GTP packet from the PGW.

10. The method of claim 9, wherein the classification identifier is a service class indicator (SCI).

11. The method of claim 1, wherein the processing of the DL network packet is based on a mapping between a) actions and b) combinations of a congestion level and a classification of DL network packets, wherein the actions includes: i) forwarding the DL network packet, ii) performing bandwidth throttling, and iii) discarding the DL network packet.

12. The method of claim 11, wherein the congestion information identifies one of at least the following three congestion levels: i) no congestion, ii) medium congestion, and iii) overloaded.

13. The method of claim 11, wherein the classification of the DL network packet is based on what application is using the DL network packet.

14. The method of claim 11, wherein the mapping maps the action of forwarding the DL network packet to: i) all combinations having a first classification for DL network packets and ii) all combinations having a second classification for DL network packets and a congestion level of no congestion.

15. The method of claim 1, wherein the classification of the DL network packet is specific to a user of the wireless communication device.

16. The method of claim 1, further comprising:
   before receiving the DL network packet, the gateway apparatus receiving a policy and charging control (PCC) rule from a PCRF, wherein the classification of the DL network packet is based on the PCC rule.

17. A gateway apparatus for mitigating end user congestion, the gateway apparatus being part of a core network and comprising:
   one or more network interfaces configured to:
      receive from a radio access network (RAN) a message comprising cell congestion information indicating that a cell of the RAN is in a congested state,
      refrain from forwarding the received cell congestion information to any policy and charging rules function (PCRF) node;
      receive a downlink (DL) network packet addressed to a wireless communication device attached to the core network via said cell of the RAN; and
   a data processing system in communication with the one or more network interfaces and configured to:
      in response to receiving the DL network packet, determine a classification of the DL network packet; and
      after determining the classification of the DL network packet, process the DL network packet in accordance with the cell congestion information and the determined classification of the DL network packet.

18. The gateway apparatus of claim 17, wherein
   the core network further comprises a mobility management entity (MME) wherein the MME receives the cell congestion information from the RAN in an Initial Context Setup Response message, wherein the one or more network interfaces of the gateway apparatus is configured to receive the cell congestion information from the MME.

19. The gateway apparatus of claim 18, wherein the one or more network interfaces of the gateway apparatus is configured to receive the cell congestion information in an information element of a Modify Bearer Request message from the MME.

20. The gateway apparatus of claim 17, wherein
the gateway apparatus is a first gateway apparatus,
the core network further comprises a second gateway apparatus that receives the DL network packet from the packet data network and determines the classification of the DL network packet,
the one or more network interfaces of the gateway apparatus is configured to receive the DL network packet and information identifying the classification of the DL network packet from the second gateway apparatus, and the data processing system is configured to determine the classification of the DL network packet based on the received information identifying the classification of the DL network packet.

21. The gateway apparatus of claim 17, wherein the data processing system is configured to process the DL network packet in accordance with the cell congestion information and the determined classification of the DL network packet by dropping the DL network packet as a result of a) determining, based on the cell congestion information, that the RAN is experiencing at least a threshold level of congestion and b) determining, based on the determined classification of the DL network packet, that the classification of the DL network packet matches one or more predetermined classifications.

22. The gateway apparatus of claim 17, wherein the data processing system is configured to process the DL network packet in accordance with the cell congestion information and the determined classification of the DL network packet by performing a traffic shaping process.

23. The gateway apparatus of claim 17, wherein the data processing system is configured to process the DL network packet in accordance with the cell congestion information and the determined classification of the DL network packet by modifying a TCP parameter.

24. The gateway apparatus of claim 23, wherein the TCP parameter is a TCP window size.

* * * * *